Figure 2:
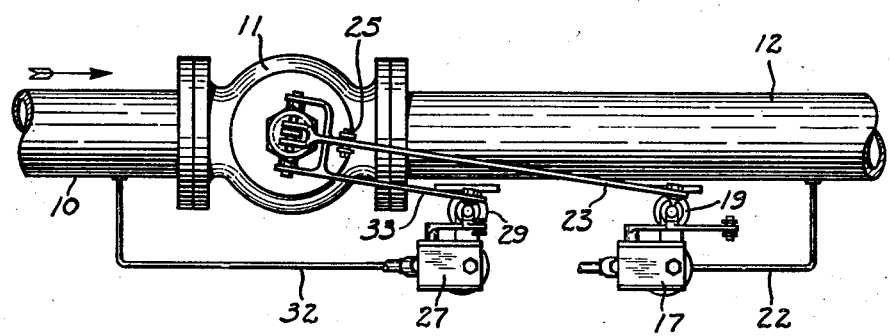

Dec. 12, 1939.   C. M. TERRY   2,183,110
REGULATING APPARATUS
Filed March 3, 1937

Inventor
CHARLES M. TERRY

By Albert G. Blodgett
Attorney

Patented Dec. 12, 1939

2,183,110

UNITED STATES PATENT OFFICE 2,183,110

REGULATING APPARATUS

Charles M. Terry, Decatur, Ill., assignor to A. W. Cash Company, Decatur, Ill., a corporation of Delaware Application March 3, 1937, Serial No. 128,780

2 Claims. (Cl. 50—10)

This invention relates to regulating apparatus, and more particularly to apparatus for regulating the pressure of fluid which flows from a high pressure zone to a low pressure zone.

In many industrial plants steam is generated at a comparatively high pressure, and a portion of the steam is used in turbines or engines for power purposes, the remainder of the steam being reduced in pressure and utilized for the heating of materials in the process of manufacture. It is a common practice to provide a pressure-reducing valve or other apparatus for maintaining the process steam at a substantially constant pressure. With these prior constructions, however, when the demand for process steam increases sufficiently, so much of the high pressure steam will be withdrawn as to cause a reduction in the pressure of the steam used for power purposes, and serious difficulties will be encountered in the operation of the turbines or engines.

It is accordingly one object of the invention to provide a regulating apparatus which will overcome this difficulty and prevent any substantial reduction in the pressure of a high pressure fluid by reason of excessive withdrawal of fluid for low pressure purposes.

It is a further object of the invention to provide a novel regulating apparatus for a system in which fluid flows from a high pressure zone to a low pressure zone, and to so arrange the various parts that the pressure in the low pressure zone will be maintained substantially constant under normal conditions, but the flow into the low pressure zone will be restricted automatically whenever necessary to prevent an injurious reduction of pressure in the high pressure zone.

With these and other objects in view, as will be apparent to those skilled in the art, the invention resides in the combination of parts set forth in the specification and covered by the claims appended hereto.

In accordance with my invention in its preferred form I provide a valve to control the flow of fluid from a high pressure zone to a low pressure zone. Means is provided to regulate the valve in response to variations in the low pressure so long as the high pressure exceeds a predetermined value, and in response to variations in the high pressure whenever the high pressure fails to exceed the said predetermined value. I preferably utilize two regulators, one responsive to the high pressure and one responsive to the low pressure, and connect both regulators to the valve in such a way that the valve will be controlled by the low pressure regulator under normal conditions and by the high pressure regulator whenever the high pressure drops below a predetermined value.

Figure 1:
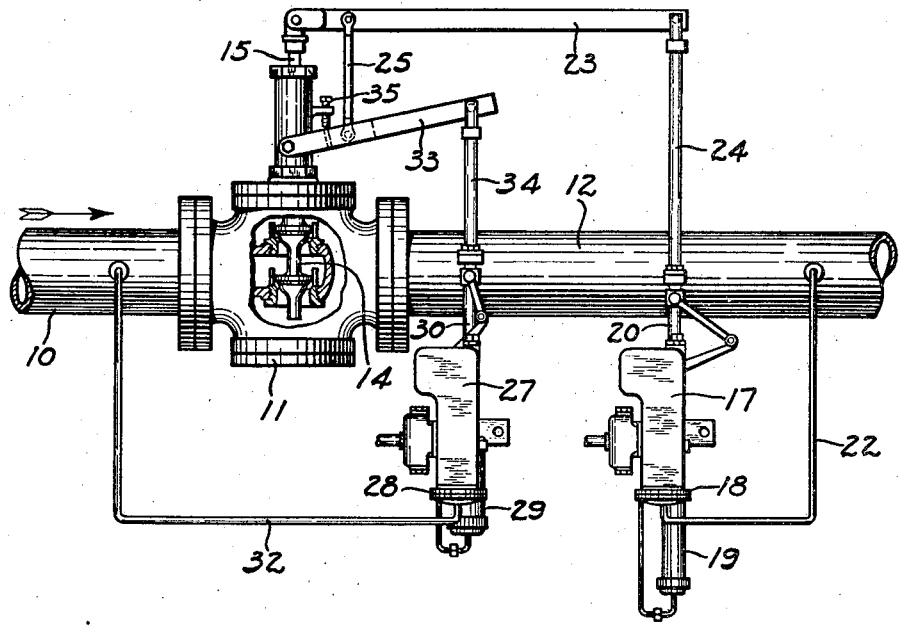

Referring to the drawing illustrating one embodiment of the invention, and in which like reference numerals indicate like parts, Fig. 1 is an elevation of a fluid-pressure regulating apparatus, certain parts being broken away for clearness of illustration; and Fig. 2 is a top plan view of the apparatus.

The embodiment illustrated comprises a pipe 10 forming a high pressure inlet zone from which fluid flows to a valve 11 and thence to a pipe 12 forming a low pressure outlet zone. The pipe 10 may receive fluid at high pressure from any suitable source, such as a steam boiler (not shown), and the pipe 12 may deliver the steam at low pressure for use in manufacturing processes. It will be understood that some of the high pressure steam generated in the boiler may be used to produce power, and that it is important to avoid any substantial reduction in the boiler pressure, although some variation in this pressure is of course permissible. For example, the boiler pressure may normally be maintained within an operating range of 410 to 425 pounds per square inch.

The valve 11 comprises a vertically reciprocable valve member 14 of the balanced type having a stem 15 extending upwardly therefrom. This valve member is regulated in accordance with the pressure in the outlet zone 12, so as to maintain this pressure substantially constant as long as the pressure in the inlet zone 10 exceeds a predetermined value of say 415 pounds. For this purpose I preferably utilize a regulator 17 of the type shown in the United States patent to Temple No. 2,049,549, comprising a diaphragm chamber 18 and a motor 19, the motor having a vertically reciprocable piston rod 20 extending upwardly therefrom. The diaphragm chamber 18 is connected to the outlet pipe 12 by means of a small pipe or tube 22, and the piston rod 20 is connected to one end of a horizontal lever 23 by means of a vertical link 24. The other end of the lever 23 is connected to the valve stem 15, and the lever is fulcrumed on the upper end of a vertical link 25. The regulator 17 may be adjusted for an outlet zone pressure of say 180 pounds per square inch and an operating range of say 5 pounds. Thus when the pressure is 180 the piston rod 20 will be at the bottom of its stroke and the valve 11 will be open, and when the pressure is 185 the piston rod will be at the top of its stroke and the valve will be closed. Intermediate pressures will result in intermediate positions for these parts.

If now the demand for steam, either for power purposes or for process purposes, should become so great as to cause an appreciable reduction in pressure in the inlet pipe 10, it is desirable to reduce the flow through the valve 11 even though this may result in reducing the outlet zone pressure considerably. For this purpose I have shown a regulator 27 similar in construction to the regulator 17 and comprising a diaphragm chamber 28 and a motor 29, the motor having a vertically reciprocable piston rod 30 extending upwardly therefrom. The diaphragm chamber 28 is connected to the inlet pipe 10 by means of a small pipe or tube 32, and the piston rod 30 is connected to one end of a horizontal lever 33 by means of a vertical link 34. The other end of the lever 33 is fulcrumed on the casing of the valve 11, and the valve casing may be provided with an adjustable screw 35 to form an abutment which limits the upward movement of the lever. The lower end of the link 25 is connected to the lever 33. With this construction the link 25 forms a movable member, and the lever 23 forms a device which is pivotally mounted thereon. In the embodiment illustrated the lever 33 is shorter than the lever 23, and the piston stroke of the regulator 27 is shorter than that of the regulator 17. The regulator 27 may be adjusted for an inlet zone pressure of say 410 pounds per square inch and an operating range of say 5 pounds. Thus when the pressure is 410 the piston rod 30 will be at the bottom of its stroke, and when the pressure is 415 the rod 30 will be at the top of its stroke, holding the lever 33 in contact with the screw 35.

The operation of the invention will now be apparent from the above disclosure. So long as the inlet zone pressure remains at 415 pounds or higher, the regulator 27 will hold the lever 33 stationary in the position shown in the drawing. Under these conditions the piston rod 20 of the regulator 17 will move up and down, rocking the lever 23, and controlling the valve member 14 as may be necessary to hold the outlet zone pressure within the operating range of 180 to 185 pounds for which the regulator is adjusted. In case the demand for steam from either zone increases greatly, the inlet zone pressure may drop below 415 pounds, and in that event the regulator 27 will rock the lever 33 downwardly, lowering the link 25 and the lever 23 fulcrumed thereon, and closing the valve 11. This of course will cause a drop in pressure in the outlet pipe 12, and the piston rod 20 of the regulator 17 will move to the bottom of its stroke, lowering the corresponding end of the lever 23. If the link 25 had remained stationary, this movement of the lever 23 would open the valve, but the link 25 has in fact been moved downwardly by the regulator 27. The various parts are so arranged that the valve can be fully closed by the regulator 27 even with the piston rod 20 of the regulator 17 in its lowermost position. Thus the valve is regulated in accordance with the pressure in the outlet zone when the pressure in the inlet zone exceeds 415 pounds and in accordance with the pressure in the inlet zone when the pressure in the inlet zone is less than 415 pounds. Moreover, it will not be possible to lower the inlet zone pressure below 410 pounds by the withdrawal of steam from the outlet zone, for by the time the inlet zone pressure reaches that value the valve will be fully closed.

Having thus described my invention, what I claim as new and desire to secure by Letters Patent is:

1. Regulating apparatus comprising a valve arranged to control the flow of fluid from an inlet zone to an outlet zone, a regulator arranged to move solely in accordance with variations in the pressure in the outlet zone, connections between said regulator and the valve including a lever, a fulcrum for the lever, a second regulator arranged to move solely in accordance with variations in the pressure in the inlet zone and to remain stationary so long as the inlet zone pressure exceeds a predetermined value, and means connecting the second regulator to the fulcrum to cause movement thereof in such a direction as to close the valve whenever the pressure in the inlet zone falls below the said predetermined value irrespective of the pressure in the outlet zone.

2. Regulating apparatus comprising a valve arranged to control the flow of fluid from an inlet zone to an outlet zone, a regulator arranged to move solely in accordance with variations in the pressure in the outlet zone, connections between said regulator and the valve including a lever, a fulcrum for the lever, a second lever connected to the fulcrum to control the position thereof, and a second regulator arranged to move solely in accordance with variations in the pressure in the inlet zone and to remain stationary so long as the inlet zone pressure exceeds a predetermined value, the second regulator being connected to the second lever to cause movement thereof in such a direction as to close the valve whenever the pressure in the inlet zone falls below the said predetermined value irrespective of the pressure in the outlet zone.

CHARLES M. TERRY.